(12) United States Patent
Cheng et al.

(10) Patent No.: US 11,733,424 B2
(45) Date of Patent: Aug. 22, 2023

(54) SYSTEMS AND METHODS FOR IDENTIFYING SUBSURFACE FEATURES AS FUNCTIONS OF FEATURE POSITIONS IN A SUBSURFACE VOLUME OF INTEREST

(71) Applicant: CHEVRON U.S.A. INC., San Ramon, CA (US)

(72) Inventors: Shuxing Cheng, Houston, TX (US); Zhao Zhang, Houston, TX (US); Kellen Leigh Gunderson, Houston, TX (US); Reynaldo Cardona, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 516 days.

(21) Appl. No.: 16/945,486

(22) Filed: Jul. 31, 2020

(65) Prior Publication Data
US 2022/0035068 A1 Feb. 3, 2022

(51) Int. Cl.
*G06N 20/00* (2019.01)
*G01V 99/00* (2009.01)
*G06F 30/27* (2020.01)
*G06F 113/08* (2020.01)

(52) U.S. Cl.
CPC .......... *G01V 99/005* (2013.01); *G06F 30/27* (2020.01); *G06N 20/00* (2019.01); *G06F 2113/08* (2020.01)

(58) Field of Classification Search
CPC .. G01V 99/005; G01V 2210/64; G01V 1/301; G06F 30/27; G06F 2113/08; G06N 20/00; G06N 3/045; G06N 3/08
See application file for complete search history.

(56) References Cited

U.S. PATENT DOCUMENTS 9,940,577 B2 4/2018 Jin et al.
9,952,594 B1 4/2018 Zhao et al.
9,953,236 B1 4/2018 Huang et al.
(Continued)

FOREIGN PATENT DOCUMENTS

CN 102037380 B * 5/2013 ............. G01V 11/00
CN 106814393 A * 6/2017 ............... G01V 1/30
(Continued)

OTHER PUBLICATIONS

Leahy et al., "Conditioning geomodels to seismic data: a streamlined interpretation workflow," First Break, vol. 32, Mar. 2014, pp. 111-116.
(Continued)

*Primary Examiner* — Kandasamy Thangavelu
(74) *Attorney, Agent, or Firm* — Sheppard, Mullin, Richter & Hampton LLP

(57) ABSTRACT

Systems, devices, and methods are disclosed for identifying subsurface features as a function of position in a subsurface volume of interest. A computer-implemented method may include obtaining training subsurface data and corresponding training subsurface feature data; obtaining an initial subsurface feature model including tiers of elements; generating a conditioned subsurface feature model by training the initial subsurface feature model using the training subsurface data and the corresponding training subsurface feature data; and storing the conditioned subsurface feature model in the non-transient electronic storage.

19 Claims, 5 Drawing Sheets

(56) References Cited

U.S. PATENT DOCUMENTS

| | | |
|---|---|---|
| 10,147,193 B2 | 12/2018 | Huang et al. |
| 10,303,522 B2 | 5/2019 | Zhou et al. |
| 10,303,956 B2 | 5/2019 | Huang et al. |
| 10,308,242 B2 | 6/2019 | Lin et al. |
| 10,311,312 B2 | 6/2019 | Yu et al. |
| 10,360,257 B2 | 7/2019 | Hou et al. |
| 10,387,736 B2 | 8/2019 | Wang et al. |
| 10,410,055 B2 | 9/2019 | Wang et al. |
| 2017/0011291 A1 | 1/2017 | Jin et al. |
| 2017/0139078 A1* | 5/2017 | Knight ............... G16B 10/00 |
| 2018/0158552 A1 | 6/2018 | Liu et al. |
| 2019/0064378 A1 | 2/2019 | Liu et al. |
| 2019/0162868 A1* | 5/2019 | Salman ................ G01V 1/48 |
| 2019/0170888 A1 | 6/2019 | Halpert et al. |
| 2019/0179983 A1* | 6/2019 | Prochnow ......... G06F 18/2137 |
| 2019/0302295 A1 | 10/2019 | Hoversten et al. |
| 2019/0324166 A1* | 10/2019 | Lolla ..................... G01V 1/42 |
| 2020/0183032 A1 | 6/2020 | Liu et al. |
| 2020/0349414 A1 | 11/2020 | Bazhenov et al. |
| 2021/0041596 A1* | 2/2021 | Kushwaha ........... G01V 1/282 |
| 2021/0293983 A1* | 9/2021 | Wei ...................... G06N 5/04 |
| 2021/0372258 A1 | 12/2021 | Kazemi Nojadeh et al. |
| 2021/0396134 A1* | 12/2021 | Al Kawai ............ E21B 49/087 |

FOREIGN PATENT DOCUMENTS

| | | | |
|---|---|---|---|
| CN | 109840660 A | 6/2019 | |
| FR | 3032532 A1 * | 8/2016 | ............ G01V 1/345 |
| WO | 2019040288 A1 | 2/2019 | |

OTHER PUBLICATIONS

Mukhopadhyay et al., "Bayesian deep learning for seismic facies classification and its uncertainty estimation," SEG International Exposition and 89th Annual Meeting (2019), pp. 2488-2492.

Pochet et al., "Seismic Fault Detection Using Convolutional Neural Networks Trained on Synthetic Poststacked Amplitude Maps," IEEE Geoscience and Remote Sensing Letters, vol. 16, No. 3, Mar. 2019, pp. 352-356.

Zhang et al., "Seismic Facies Analysis Based on Deep Learning," IEEE Geoscience and Remote Sensing Letters, vol. 17, No. 7, Jul. 2020, pp. 1119-1123.

International Search Report and Written Opinion dated Nov. 17, 2021 for International Application No. PCT/US2021/043900, filed Jul. 30, 2021.

International Search Report and Written Opinion dated Nov. 15, 2021 for International Application No. PCT/US2021/043909, filed Jul. 30, 2021.

Non-final Office Action dated Mar. 31, 2023 for U.S. Appl. No. 16/945,517, filed Jul. 31, 2020.

* cited by examiner

SYSTEMS AND METHODS FOR IDENTIFYING SUBSURFACE FEATURES AS FUNCTIONS OF FEATURE POSITIONS IN A SUBSURFACE VOLUME OF INTEREST

FIELD OF THE DISCLOSURE

The present disclosure relates to systems and methods for identifying subsurface features as functions of feature positions.

SUMMARY

Implementations of the present disclosure include systems, methods, devices, and apparatuses capable of identifying subsurface features as functions of feature positions in the subsurface volume of interest. In accordance with the technology described herein, a computer-implemented method for training a subsurface feature model to identify subsurface features as functions of feature positions in a subsurface volume of interest is disclosed. The computer-implemented method may be implemented in a computer system that includes a physical computer processor and non-transient electronic storage. The computer-implemented method may include a number of operations. One operation may include obtaining training subsurface data and corresponding training subsurface feature data. The training subsurface data may include a subsurface energy value. The corresponding training subsurface feature data may include a training structural identification value defined by structural identification parameters and a corresponding training categorization value defined by categorization parameters and the training structural identification value. One operation may include obtaining an initial subsurface feature model including tiers of elements. The tiers may include a first tier including a structural identification element corresponding to the training structural identification value and a second tier, dependent on the structural identification value, including a categorization element corresponding to the training categorization value. One operation may include generating a conditioned subsurface feature model by training the initial subsurface feature model using the training subsurface data and the corresponding training subsurface feature data. One operation may include storing the conditioned subsurface feature model.

In implementations, another operation may include obtaining target subsurface data including subsurface energy values for the feature positions in the subsurface volume of interest. One operation may include generating target subsurface feature data by applying the first conditioned subsurface feature model to the target subsurface data. The target subsurface feature data may include a target structural identification value defined by the structural identification parameters for the feature positions in the subsurface volume of interest and a corresponding target categorization value defined by the categorization parameters and the target structural identification value associated with the subsurface volume of interest.

In implementations, the computer system may include a display. Another operation may include generating a representation of geological structures positions of the structures in the subsurface volume of interest using visual effects to depict at least some of the target subsurface feature data. One operation may include displaying the representation.

In implementations, the structural identification values may indicate whether or not there is a subsurface feature.

In implementations, the categorization values may indicate one of what category the subsurface feature is categorized as and what sub-category the subsurface feature is categorized as.

In implementations, the structural identification parameters may include one of a geometric shape of subsurface horizons and a truncation of the subsurface horizons against other geologic elements.

In implementations, the categorization parameters may include one of a histogram of oriented gradients (HOG), a scale-invariant feature transform (SIFT), and an analog geologic feature.

In implementations, different ones of the structural identification parameters and the categorization parameters may be weighted differently based on the conditioned subsurface feature model.

In implementations, a structure of the tiers may correspond to a hierarchy of geological taxonomy.

In implementations, the categorization element may include one of an extensional element, a faulted element, a contractional fold element, a salt element, a fault bend fold element, a tip-line fold element, a detachment fold element, and a gas chimney element.

In implementations, the subsurface feature models may include one of a mask R-CNN network, a feature pyramids network, an object detection network, a neural network, a random forest model, a support vector machine, a regression, and a Bayesian network.

In implementations, another operation may include generating uncertainty corresponding to the target subsurface feature data. The conditioned subsurface feature model may include a subsurface feature uncertainty model. Applying the uncertainty model to target subsurface data may generate target subsurface feature data probabilities indicating a structural identification value probability and a corresponding target categorization value probability.

In accordance with the technology described herein, a computer-implemented method for identifying subsurface features as functions of positions in a subsurface volume of interest is disclosed. The computer-implemented method may be implemented in a computer system that includes a physical computer processor and electronic storage. The method may include a number of operations. One operation may include obtaining a conditioned subsurface feature model including tiers of elements. The conditioned subsurface feature model may have been generated by applying the initial subsurface feature model to the training subsurface data and the training subsurface feature data. The tiers may include a first tier including structural identification elements corresponding to training structural identification values and a second tier, dependent on the structural identification values, including categorization elements corresponding to training categorization values. The training subsurface data may include subsurface energy values. The training subsurface feature data may include the training structural identification values defined by structural identification parameters and corresponding training categorization values defined by categorization parameters and one of the training structural identification values. One operation may include obtaining target subsurface data including subsurface energy values for the feature positions in the subsurface volume of interest. One operation may include generating target subsurface feature data by applying the first conditioned subsurface feature model to the target subsurface data. The target subsurface feature data may include a target structural identification value defined by the structural identification parameters for the feature positions in the subsurface volume of interest and a corresponding target categorization value defined by the categorization parameters and the target structural identification value associated with the subsurface volume of interest.

In implementations, the computer system may include a display. Another operation may include generating a representation of geological structures positions of the structures in the subsurface volume of interest using visual effects to depict at least some of the target subsurface feature data. One operation may include displaying the representation.

In implementations, the categorization element may include one of an extensional element, a faulted element, a contractional fold element, a salt element, a fault bend fold element, a tip-line fold element, a detachment fold element, and a gas chimney element.

In implementations, the subsurface feature models may include one of a mask R-CNN network, a feature pyramids network, an object detection network, a neural network, a random forest model, a support vector machine, a regression, and a Bayesian network.

Another operation may include generating uncertainty corresponding to the target subsurface feature data based on $$H(P) = -\sum_{c=1}^{c=M} P(SubFeat = C) \log P(SubFeat = C)$$

where c represents a given category of the subsurface feature, M represents different categories of subsurface features, and P(SubFeat=C) represents a probability of the recognized subsurface feature of a given category.

In accordance with the technology described herein, a system for identifying subsurface features as functions of positions in a subsurface volume of interest is disclosed. The system may include electronic storage and a physical computer processor configured by machine readable instructions to perform a number of operations. One operation may include obtaining a conditioned subsurface feature model including tiers of elements. The conditioned subsurface feature model may have been generated by applying the initial subsurface feature model to the training subsurface data and the training subsurface feature data. The tiers may include a first tier including structural identification elements corresponding to training structural identification values and a second tier, dependent on the structural identification values, including categorization elements corresponding to training categorization values. The training subsurface data may include subsurface energy values. The training subsurface feature data may include the training structural identification values defined by structural identification parameters and corresponding training categorization values defined by categorization parameters and one of the training structural identification values. One operation may include obtaining target subsurface data including subsurface energy values for the feature positions in the subsurface volume of interest. One operation may include generating target subsurface feature data by applying the first conditioned subsurface feature model to the target subsurface data. The target subsurface feature data may include a target structural identification value defined by the structural identification parameters for the feature positions in the subsurface volume of interest and a corresponding target categorization value defined by the categorization parameters and the target structural identification value parameters and the target structural identification value associated with the subsurface volume of interest. The target structural identification value and the corresponding target categorization value may be based on a subset of the target subsurface data.

In implementations, the system may include a display. Another operation may include generating a representation of geological structures and positions of the structures in the subsurface volume of interest using visual effects to depict at least some of the target subsurface feature data. One operation may include displaying the representation via the display.

In implementations, the subsurface feature models may include one of a mask R-CNN network, a feature pyramids network, an object detection network, a neural network, a random forest model, a support vector machine, a regression, and a Bayesian network.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations, of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
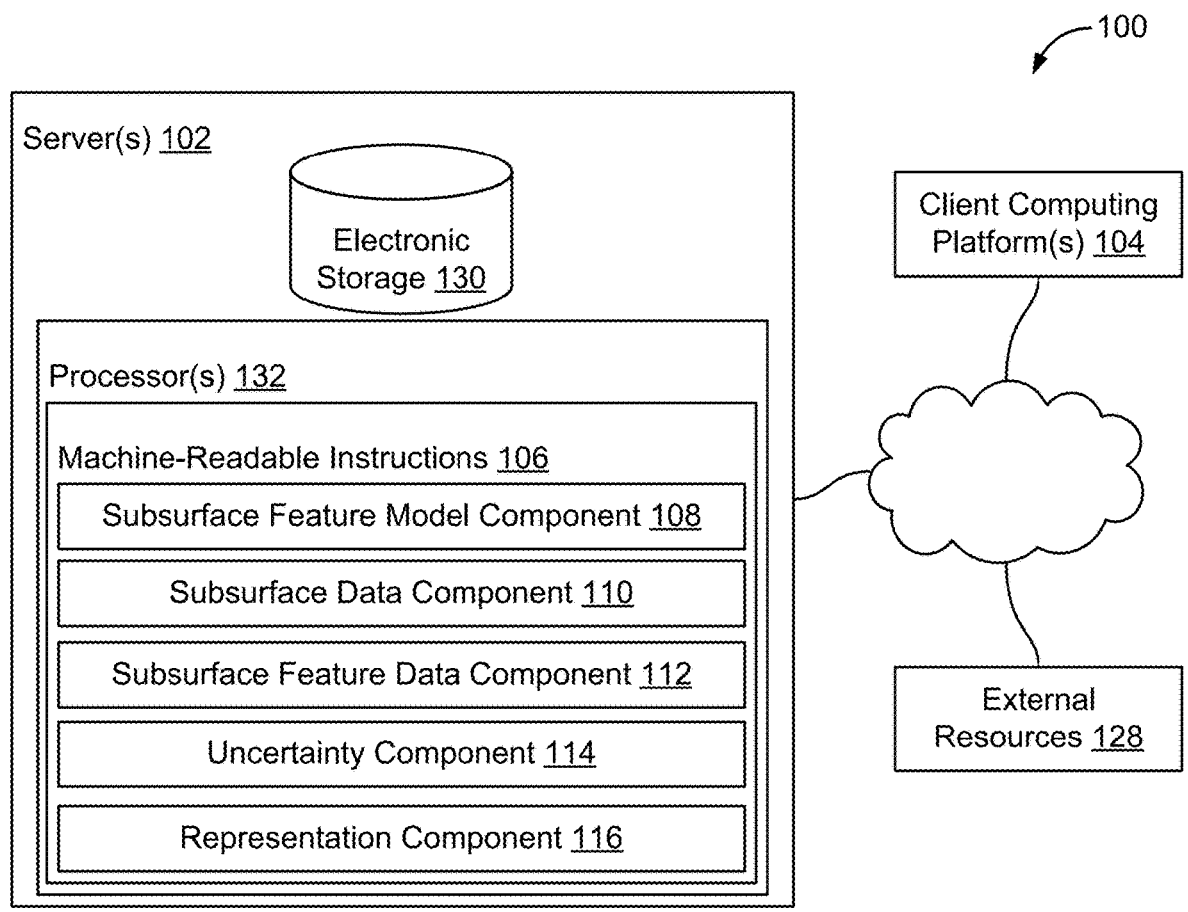
FIG. 1 illustrates a system for identifying subsurface features as functions of feature positions in a subsurface volume of interest, in accordance with one or more implementations.

Existing approaches for identifying subsurface features in a subsurface volume of interest struggle with handling the significant volume of geophysical data now available. Traditional techniques also either require subjective analysis or are narrowly tailored to generate binary results. For example, while subject matter experts may be able to identify whether or not a structural feature is in seismic data, it will not also provide information indicating why it identified a structure feature, or why it did not identify a structural feature. Moreover, the existing technology does not provide uncertainty or a probabilistic nature of these binary results.

Disclosed are systems and methods for identifying subsurface features as functions of feature positions in a subsurface volume of interest. Position may refer to a 1D, 2D, and/or 3D space. The presently disclosed technology can generate objective, interpretable estimates of subsurface features as functions of feature positions in a subsurface volume of interest based on subsurface data. For example, the presently disclosed technology may use machine learning techniques (e.g., object identification, mask-RCNN, feature pyramid, and so on) to train a model using training data. The model may have multiple tiers of categorization of the subsurface data. For example, a first tier may be used to identify whether the subsurface data has subsurface features. A second tier may be used for subsurface data that has subsurface features. The second tier may be used to identify what category of subsurface features the identified subsurface feature is. A third tier may be used to identify what subcategory the subsurface features belongs to and so on. The model may select an element in each tier. The selected element in each tier may be based on a parameter. Each relevant parameter may be identified in the subsurface feature data. In implementations, each selected element may have an uncertainty that is presented as a probability. The trained model can be applied to actual subsurface data to generate subsurface feature data that identifies what subsurface features are in the actual subsurface data. In implementations, the subsurface feature data may provide information on why an element within each tier was selected, or a probability of the selected element. Accordingly, the presently disclosed technology may be used to generate subsurface feature data that can be used by geologists to better interpret the subsurface data.

The subsurface volume of interest may refer to practically anything under a surface. For example, the subsurface volume of interest may be practically anything under a terrestrial surface (e.g., practically anything under a land surface), practically anything under a seafloor, etc. A water column may be above the subsurface volume of interest, for example, in marine hydrocarbon exploration, in marine hydrocarbon recovery, etc. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, salts, salt welds, rocks, sands, sediments, pore space, etc. The subsurface volume of interest may include practically any geologic point or volume of interest (such as a survey area).

The subsurface volume of interest may also include hydrocarbons, such as liquid hydrocarbons (also known as oil or petroleum), gas hydrocarbons (e.g., natural gas), solid hydrocarbons (e.g., asphaltenes or waxes), a combination of liquid hydrocarbons, gas hydrocarbons, and solid hydrocarbons, etc. Light crude oil, medium oil, heavy crude oil, and extra heavy oil, as defined by the American Petroleum Institute (API) gravity, are examples of hydrocarbons. Indeed, examples of hydrocarbons are many, and may include, oil, natural gas, kerogen, bitumen, clathrates (also referred to as hydrates), etc. The subsurface volume of interest may be known to include hydrocarbons in some implementations. However, the subsurface volume of interest may not be known to include hydrocarbons, such as during hydrocarbon exploration, in other implementations.

The subsurface volume of interest, the hydrocarbons, or any combination thereof may also include non-hydrocarbon items. For example, non-hydrocarbon items may include connate water, brine, tracers, items used in enhanced oil recovery or other hydrocarbon recovery processes, items from other types of treatments (e.g., gels used in conformance control), etc.

In short, each subsurface volume of interest may have a variety of characteristics, such as petrophysical rock properties, reservoir fluid properties, reservoir conditions, or any combination thereof. For example, each subsurface volume of interest may be associated with at least one of: subsurface feature, subsurface property, temperature, porosity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, a methane hydrate containing subsurface volume of interest, a mineral containing subsurface volume of interest, a metal containing subsurface volume of interest, a subsurface volume of interest having a permeability in the range of 0.01 microdarcy to 10 millidarcy, a subsurface volume of interest having a permeability in the range of 10 millidarcy to 40,000 millidarcy, etc.

FIG. 1 illustrates a system for identifying subsurface features as functions of feature positions in a subsurface volume of interest, in accordance with one or more implementations. In some implementations, system 100 may include a server 102. Server 102 may be configured to communicate with a client computing platform 104 according to a client/server architecture and/or other architectures. Client computing platform 104 may be configured to communicate with other client computing platforms via server 102 and/or according to a peer-to-peer architecture and/or other architectures. Users may access system 100 via client computing platform 104.

Server 102 may be configured by machine-readable instructions 106. Machine-readable instructions 106 may include an instruction component. The instruction component may include computer program component. The instruction component may include a subsurface feature model component 108, a subsurface data component 110, a subsurface feature data component 112, an uncertainty component 114, a representation component 116, and/or another instruction component.

Subsurface feature model component 108 may be configured to obtain an initial subsurface feature model. The initial subsurface feature model may be based on machine learning techniques to map at least one variable to at least another variable. For example, the initial subsurface feature model may receive subsurface data as input and output subsurface feature data. The initial subsurface feature model may be "untrained" or "unconditioned," indicating it may not estimate an output based on the input as accurately as a "trained" or "conditioned" model.

The subsurface feature model may include tiers of elements. For example, a first tier may include a structural identification element. The structural identification element may include a structural identification value, as will be discussed herein. A second tier may include a categorization element. The categorization element may include a categorization value, as will be discussed herein. A third tier may include a subcategorization element. The subcategorization element may include a categorization value. It should be appreciated that the subsurface feature model may include additional tiers corresponding to categories below the subcategorization element. The categorization element may include one of an extensional element, a faulted element, a contractional fold element, a salt element, a fault bend fold element, a tip-line fold element, a detachment fold element, and a gas chimney element. It should be appreciated that this list is not exhaustive, and other categorization elements are appropriate.

The tiers may be similar to a tree-like structure that branches out into categories, corresponding sub-categories, and so on. In some implementations, the second tier may be dependent on the structural identification element. For example, should the structural identification element indicate a subsurface feature is present in the target subsurface data, the categorization element may indicate a category of subsurface features present in the target subsurface data. The tiered structure may allow a user to review each step of the subsurface feature model's analysis to determine why the subsurface feature model identified a given subsurface feature in the target subsurface data. In some implementations, the structure of the tiers may correspond to a geological taxonomy hierarchy.

Subsurface data may include subsurface energy values. The subsurface energy values may be the data collected and/or measured by sending energy through a subsurface volume of interest to a receiver. In some implementations, the subsurface energy values may be characterized as the response of the elastic wavefield to contrasts across interfaces of subsurface layers as energy travels from a source through the subsurface to a receiver. The subsurface data may include a seismic angle stack value, a prestack seismic property value, and an amplitude versus offset (AVO) gather value. It should be appreciated that these are exemplary; other subsurface data may include 1D seismic data, 2D seismic data, 3D seismic data, 4D seismic data, 3C seismic data, and/or 4C seismic data. In some implementations, the subsurface data may include a representation of the seismic energy values, such as, for example a seismic image. The subsurface data may be heterogenous (e.g., multiple different categories of subsurface features) or homogenous (e.g., a single category of subsurface feature).

Subsurface feature data may include structural identification values and/or categorization values. The subsurface feature data may be used to identify and/or estimate the identities and locations of subsurface features in the subsurface volume of interest. In implementations, subsurface feature data may use geological features, geological structures, seismic structures, structural traps, stratigraphic traps, faults, fractures, folds, unconformities, methane gas chimneys, etc. to identify subsurface features. Subsurface features may be features produced by deformation of the earth's crust in the subsurface volume of interest.

The structural identification values may indicate whether or not there is a subsurface feature. For example, a first structural identification value may indicate no subsurface feature is present in a subset of the subsurface data. A second structural identification value may indicate some type of subsurface feature is present in a subset of the subsurface data. The structural identification values may be generated based on domain knowledge, collected samples of corresponding subsurface structures, and/or other data. The structural identification values may be defined by structural identification parameters. For example, the structural identification parameters may affect a structural value. A first structural identification parameter with a first weight, a second structural identification parameter with a second weight, and a third structural identification parameter with a third weight may be added, subtracted, or otherwise manipulated together to determine a structural identification value. While three structural identification parameters are listed, it should be appreciated that more or fewer structural identification parameters may be used. Structural identification parameters may include the geometric shape of subsurface horizons (e.g., domal, bowl shaped, etc.), or truncation of subsurface horizons against other geologic elements.

In some implementations, the structural identification parameters may specify which aspects of a subsurface feature to focus on in the subsurface data. The structural identification parameters may be selected based on aspects of a subsurface feature that have the greatest impact on identifying whether or not a subsurface feature is present in subsurface data, which is sometimes known as "feature engineering." In implementations, feature engineering may be accomplished based on machine learning, domain knowledge, and/or other techniques.

The categorization values may indicate what category the subsurface feature is categorized as and/or what sub-category the subsurface feature is categorized as. For example, the categorization value may indicate that a subset of the subsurface data is likely categorized as a folded subsurface feature. In implementations, the categorization value may indicate that the subset of the subsurface data is likely in a sub-category of the folded subsurface feature, such as, for example, a fault bend fold sub-category. The categorization values may be generated based on domain knowledge, collected samples of corresponding subsurface structures, and/or other data. The categorization values may be defined by categorization parameters. In some implementations, the categorization values may be defined by categorization parameters and the structural identification values. For example, the categorization parameters may affect a categorization value. A first categorization parameter with a first weight, a second categorization parameter with a second weight, and a third categorization parameter with a third weight may be added, subtracted, or otherwise manipulated together to determine a categorization value. While three categorization parameters are listed, it should be appreciated that more or fewer categorization parameters may be used. Categorization parameters may include image-based features (e.g., Histogram of oriented gradients (HOG), scale-invariant feature transform (SIFT), and/or parameters similar to analog geologic features that may be derived from conceptual geologic models.

In some implementations, the categorization parameters may specify which aspects of a subsurface feature category to focus on in the subsurface data. The categorization parameters may be selected based on aspects of a subsurface feature category that have the greatest impact on identifying subsurface features in subsurface data, which is sometimes known as "feature engineering." In implementations, feature engineering may be accomplished based on machine learning, domain knowledge, and/or other techniques.

In some implementations, different ones of the structural identification parameters and the categorization parameters may be weighted differently based on the conditioned subsurface feature model.

The subsurface feature models disclosed herein may include, for example, a neural network, a random forest model, a support vector machine, a regression, a Bayesian network, a mask R-CNN network, a feature pyramids network, an object detection network, an object recognition network, and/or other subsurface feature models. It should be appreciated that other subsurface feature models may include, for example, convolutional neural networks, reinforcement learning, transfer learning, and/or other machine learning technologies. In implementations, the subsurface feature model may use bounding boxes, seismic interpretation results, and/or labels to identify subsurface features.

In one example, the subsurface feature model may be a deep learning network with a latent space. In the latent space constructed by convolutional layers, every prototypical candidate may be taught to match an image patch for the images belonging to the same category of subsurface feature. These learned prototype patches may be used to compare against the input images in a prediction stage of the subsurface feature model. A similarity score, possibly a weighted sum based on multiple prototypes, may be used to make an identification decision. The learned prototype patches and a part of the seismic image that is most activated in the comparison process may provide an interpretable logic for the identification decision. Based on multiples parts in a seismic image patch being very similar to multiple prototypes of a given category of subsurface feature, the subsurface feature model may localize this image patch, mark this patch with the subsurface feature, and label it.

Referring back to FIG. 1, in some implementations, subsurface feature model component 108 may be configured to generate a conditioned subsurface feature model. The conditioned subsurface feature model may be generated by training the initial subsurface feature model using training subsurface data and training subsurface feature data. In implementations, the subsurface feature model is "conditioned," indicating the subsurface feature model may have been trained to optimize performance and/or improve accuracy of the initial subsurface feature model. For example, the conditioned subsurface feature model may more accurately output subsurface feature data using subsurface data as input. In some implementations, the conditioned subsurface feature model may identify subsurface features in the subsurface volume of interest. In implementations, the conditioned subsurface feature model may be trained using generic subsurface data such that the conditioned subsurface feature model may be implemented in any subsurface volume of interest that is not limited to the volume of interest from which the generic training data is sampled and/or generated.

Training the initial subsurface feature model may include applying the training subsurface data to the initial subsurface feature model to generate a first iteration of subsurface feature data. The initial subsurface feature model may be adjusted to more accurately estimate the subsurface feature data based on differences between the first iteration of subsurface feature data and the training subsurface feature data that corresponds to the training subsurface data. This is repeated numerous times until the initial subsurface feature model is "conditioned," i.e., it is able to output subsurface feature data that is consistently within a threshold of the training subsurface feature data. In some implementations, the threshold may depend on the speed of the subsurface feature model, resources used by the subsurface feature model, and/or other optimization metrics. This threshold may be based on an average of values, a maximum number of values, and/or other parameters. It should be appreciated that other metrics may be applied to determine that the first subsurface feature model is "conditioned."

In some implementations, subsurface feature model component 108 may be configured to store the conditioned subsurface feature model. For example, the conditioned subsurface feature model can be stored in a non-transitory storage medium, electronic storage 130, non-transient computer readable mediums, and/or optical storage. It should be appreciated that these are merely examples and that the conditioned subsurface feature model can be stored in other storage as well (e.g., structured storage, unstructured storage, and/or virtual storage).

Subsurface data component 110 may be configured to obtain and/or generate training subsurface data. The training subsurface data may be used to train a subsurface feature model, as discussed herein. The training subsurface data may initially be collected and/or measured via sensors in a subsurface volume of interest (e.g., field data) and/or be generated through the use of simulation models (e.g., synthetic data). Field data may be collected and/or measured from a well and/or reservoir in a subsurface volume of interest. Field data may include seismic data, seismic images, and/or other data. In some implementations, the subsurface data may be processed via statistical analysis, visualization techniques, scaling, warping, denoised, noised, and/or other means before being used to train the initial subsurface feature models. For example, domain experts may select and manipulate field data that simulates prototypical candidates of a subsurface feature to generate the training subsurface data. In some implementations, the selected candidates may be scaled up or down, warped, denoised, noised, and otherwise manipulated to simulate a variety of target subsurface data. In implementations, domain experts may generate prototypical candidates from scratch. In some implementations, the simulation models may be based on one of computational stratigraphy, kinematic forward models, geostatistics models, or geomechanical forward models. For example, geostatistics model may be in accordance with prior probabilistic distributions associated with each specific geological feature type. The geostatistics model may be used to generate synthetic subsurface feature data based on pre-determined sampling mechanisms and probability mixture models. The subsurface data may be stored, and examples of such storage are discussed herein. The stored subsurface data may be obtained and/or used as part of the training subsurface data. In other words, training subsurface data may use one or both of field data and synthetic data. In implementations, the training subsurface data may be labeled, categorization, and/or otherwise pre-identified as being a subsurface feature and/or a category of subsurface feature.

In some implementations, subsurface data component 110 may be configured to obtain target subsurface data. The target subsurface data may be field data (e.g., data that is collected and/or measured from a well and/or reservoir). In other words, the target subsurface data does not have corresponding subsurface feature data to confirm the conditioned subsurface feature model is accurately identifying subsurface features in the subsurface data. In implementations, the target subsurface data may have corresponding subsurface feature data and be used to verify the conditioned nature of the conditioned subsurface feature model. The target subsurface data may include subsurface energy values in a subsurface volume of interest. In implementations, the target subsurface data may be preprocessed via denoising, data augmentation, and/or other existing preprocessing techniques, as discussed herein. While a singular set of target subsurface data is described, it should be appreciated that multiple sets of target subsurface data may be obtained and/or generated.

Subsurface feature data component 112 may be configured to obtain and/or generate training subsurface feature data. The training subsurface feature data may be used to train an initial subsurface feature model, as discussed herein. The training subsurface feature data may initially be collected and/or measured via sensors in a subsurface volume of interest (e.g., field data) and/or be generated through the use of simulation models (e.g., synthetic data), as described herein. The same simulation models used to generate the training subsurface data may also be able to use the training subsurface data to generate training subsurface feature data, or vice versa. The subsurface feature data may be engineered by domain experts to simulate the wide variety of potential subsurface data that can be collected and analyzed to generate the subsurface feature data, as described herein. The synthetic subsurface feature data may be stored, and examples of such storage are discussed herein. The stored synthetic subsurface feature data may be obtained and/or used as part of the training subsurface feature data. In other words, training subsurface feature data may use one or both of field data and synthetic data.

In implementations, the training subsurface feature data may correspond to the training subsurface data. In some implementations, the training subsurface feature data may be derived from the training subsurface data using prototypical subsurface feature candidates, the simulation model, fluid models, rock physics, and/or other models.

In some implementations, subsurface feature data component 112 may be configured to generate target subsurface feature data. The target subsurface feature data may be generated by applying the conditioned subsurface feature model to the target subsurface data. As discussed herein, the first conditioned subsurface feature model can accurately estimate the target subsurface feature data using the target subsurface data as input because the conditioned subsurface feature model has been "trained" or "conditioned." The target subsurface feature data may identify a subsurface feature in the subsurface volume of interest. The target subsurface feature data may include a target structural identification value and a target categorization value. The target structural identification value may be defined by the structural identification parameters for the feature positions in the subsurface volume of interest. The target categorization value may be defined by the categorization parameters and the target structural identification value associated with the subsurface volume of interest.

Uncertainty component 114 may be configured to generate uncertainty. The uncertainty may help to determine how accurate values in the subsurface feature data are. In implementations, the uncertainty may specify a likelihood a value is accurate. In some implementations, the uncertainty may specify a range of values between which a "true" value exists. For example, the uncertainty may be in the form of an error bar, a confidence interval, a probability distribution, a standard deviation, standard error, and/or another format. In some implementations, the uncertainty may be generated using a Bayesian-based model, a deep-learning model, and/or other models. In implementations, the uncertainty model used to generate the uncertainty may be included in the subsurface feature model. The uncertainty model may generate target subsurface feature data probabilities, structural identification value probabilities, and/or categorization value probabilities.

The uncertainty may be derived from one of the following sources: subsurface data, sensors, models, interpolation, and/or noise. In some implementations, the differences may be based on different values in the target subsurface feature data derived from changes to a common error source between training subsurface data, such as, for example, noise (e.g., derived from subsurface feature models, noise type, natural noise sources, etc.), interpolation, model (e.g., subsurface feature model designs, model components, machine learning models, prototypical candidates of subsurface features in subsurface data, thresholds, etc.), parameter uncertainty (e.g., limited to sample data), and/or other sources.

In one example, the uncertainty may be used to generate a probability that a model arrives at a given structural identification value and a given categorization value. Relating this back to the tiered elements of the subsurface feature model, the first tier may indicate a 70% probability of a first structural identification value and a 30% probability of a second structural identification value. A second tier, corresponding to the 70% probability above, may have a 40% probability of a first categorization value, a 30% probability of a second categorization value, a 20% probability of a third categorization value, and a 10% probability of a fourth categorization value. In implementations, the subsurface feature model may generate the most likely structural identification value and categorization value and their corresponding probabilities. In some implementations, probabilities of other less likely structural identification values and categorization values may be generated as well.

In one example, to address uncertainty from noise in seismic images, a softmax function may be used. This may encode the probabilistic classification result.

In another example, model uncertainty may be addressed using a posterior probability distribution. For example, multiple forward passes of the subsurface feature model runs with dropout mechanism instantiations may be leveraged. This may be defined by $$P(SubFeat = C) \approx \frac{1}{T}\sum_{i=1}^{i=T} \mathcal{D}(S, \mathcal{W}^i)$$

where P(SubFeat=C) may represent a probability of the recognized subsurface feature of a given category, C, T may represent the number of forward passes with dropout mechanism instantiations, D may represent the model architecture, S may represent the seismic image, and the weight $W^i$ may represent the weight configuration in the i-th forward pass. In implementations, there may be M different categories of subsurface features, which may correspond to a multinomial distribution. This can be treated as an underlying probabilistic model characterizing the learned subsurface feature model. Entropy can then be used to measure the epistemic uncertainty based on the following $$H(P) = -\sum_{c=1}^{c=M} P(SubFeat = C) \log P(SubFeat = C)$$

where the variables are substantially similar to, or the same as, the above variables.

Representation component 116 may be configured to generate a representation of the subsurface data, subsurface feature data, and/or uncertainty. The representation may be generated using visual effects to depict at least some of the subsurface data, subsurface feature data, and/or uncertainty based on the feature positions. The visual effects may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). In some implementations, a representation of the other subsurface data, subsurface feature data, uncertainty, and/or a combination of this data may be generated. In some implementations, the representation may be a video.

In one example, the representation may include a map overlay. The map overlay may include a digital elevation model map, a gross depositional environment map, a geophysical attribute, a physical map, a political map, seismic image, subsurface image, and/or other types of images. The map may be displayed as a raster image, a contour map, or a thematic map; it may also be partially transparent to view other information displayed below it. The first representation may illustrate a map of the subsurface volume of interest and corresponding subsurface data, subsurface feature data, and/or uncertainty. Different sets of data may be represented using different colors and/or shades of a color.

For example, a first set of target subsurface feature data may be represented using a color gradient, a second set of target subsurface feature data may be represented using a color bar (e.g., different colors), and/or other visual effects to represent the subsurface data, subsurface feature data, and/or uncertainty. In one example, target subsurface data may be under visually transparent subsurface feature data that outlines and identifies subsurface features in the subsurface volume of interest. In some implementations, probabilities may be displayed next to structural identification values and categorization values. In implementations, selecting an identified subsurface feature may display additional information about the subsurface feature, which may include greater detail on probabilities, assumptions in the conditioned subsurface feature model, tiered analysis based on the structural identification values and categorization values, and/or other information and metadata about the subsurface feature, including what category or subcategory it corresponds to.

Representation component 116 may be configured to display the representation. The representation may be displayed on a graphical user interface and/or other displays. The graphical user interface may include a user interface based on graphics and/or text. In implementations, a user may zoom in on and/or view a location of the volume of interest to illustrate more detail on a given location. The graphical user interface may be configured to receive voice input, gestures, haptic input, keyboard, mouse, and/or other input.

In some implementations, server 102, client computing platform 104, and/or external resources 128 may be operatively linked via an electronic communication link. For example, such electronic communication link may be established, at least in part, via a network such as the Internet and/or other networks. It will be appreciated that this is not intended to be limiting, and that the scope of this disclosure includes implementations, in which server 102, client computing platform 104, and/or external resources 128 may be operatively linked via some other communication media.

A given client computing platform 104 may include a processor to execute computer program components. The computer program components may enable a user corresponding to the given client computing platform 104 to interface with system 100 and/or external resources 128, and/or provide other functionality attributed herein to client computing platform 104. By way of non-limiting example, the given client computing platform 104 may include a desktop computer, a laptop computer, a handheld computer, a tablet computing platform, a Netbook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server 102 may include electronic storage 130, processor 132, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 130 may include storage media that electronically stores information. The electronic storage media of electronic storage 130 may include one or both of system storage that is provided integrally (i.e., substantially non-removable) with server 102 and/or removable storage that is removably connectable to server 102 via, for example, a port (e.g., a USB port, a firewire port, and/or other ports) or a drive (e.g., a disk drive and/or other drives). Electronic storage 130 may include non-transitory storage medium, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130 may include a virtual storage resource (e.g., cloud storage, a virtual private network, and/or other virtual storage resources). Electronic storage 130 may store software algorithms, information determined by processor 132, information received from server 102, information received from client computing platform 104, and/or other information that enables server 102 to function as described herein. It should be appreciated that the information may be stored in its natural and/or raw format (e.g., data lakes).

Processor 132 may provide information processing capabilities in server 102. As such, processor 132 may include a physical computer processor, a digital processor, an analog processor, a digital circuit designed to process information, an analog circuit designed to process information, a state machine, and/or other mechanisms for electronically processing information. Although processor 132 is shown in FIG. 1 as a single entity, this is for illustrative purposes only. In some implementations, processor 132 may include a plurality of processing units. These processing units may be physically located within the same device, or processor 132 may represent processing functionality of a plurality of devices operating in coordination. Processor 132 may execute components 108, 110, 112, 114, 116, and/or other components. Processor 132 may execute components 108, 110, 112, 114, 116, and/or other components by software; hardware; firmware; some combination of software, hardware, and/or firmware; and/or other mechanisms for configuring processing capabilities on processor 132. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108, 110, 112, 114, and 116 are illustrated in FIG. 1 as being implemented within a single processing unit, in implementations, in which processor 132 includes multiple processing units, one of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one of components 108, 110, 112, 114, and/or 116 may be eliminated, and some or all of its functionality may be provided by other ones of components 108, 110, 112, 114, and/or 116. As an example, processor 132 may execute an additional component that may perform some or all of the functionality attributed below to components 108, 110, 112, 114, and/or 116.

Figure 2:
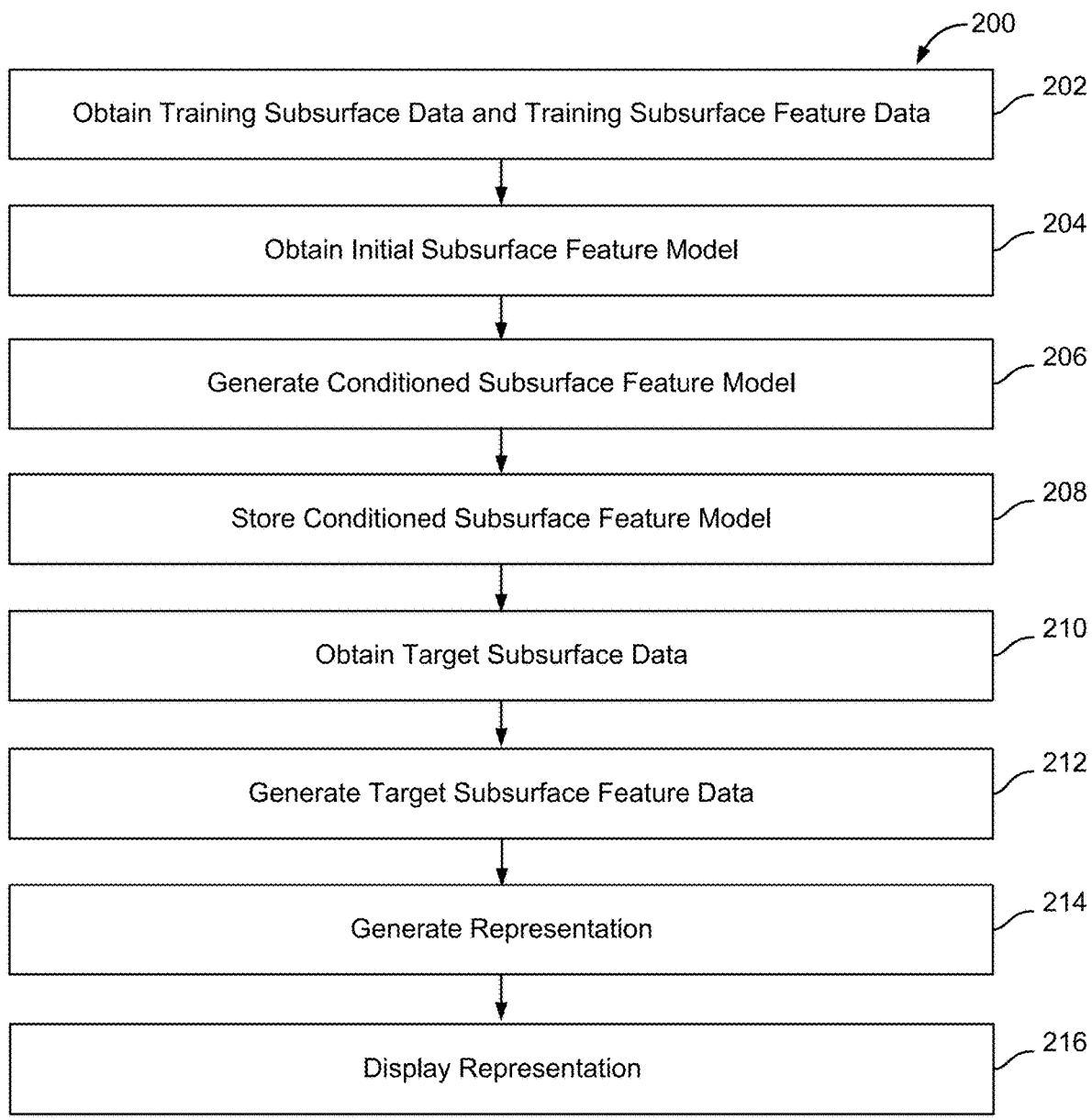
FIG. 2 illustrates an example operational flow diagram 200 for training a subsurface feature model to identify subsurface features as functions of feature positions in a subsurface volume of interest and identifying subsurface features as functions of feature positions in a subsurface volume of interest, in accordance with one or more implementations of the present disclosure.
Figure 3:
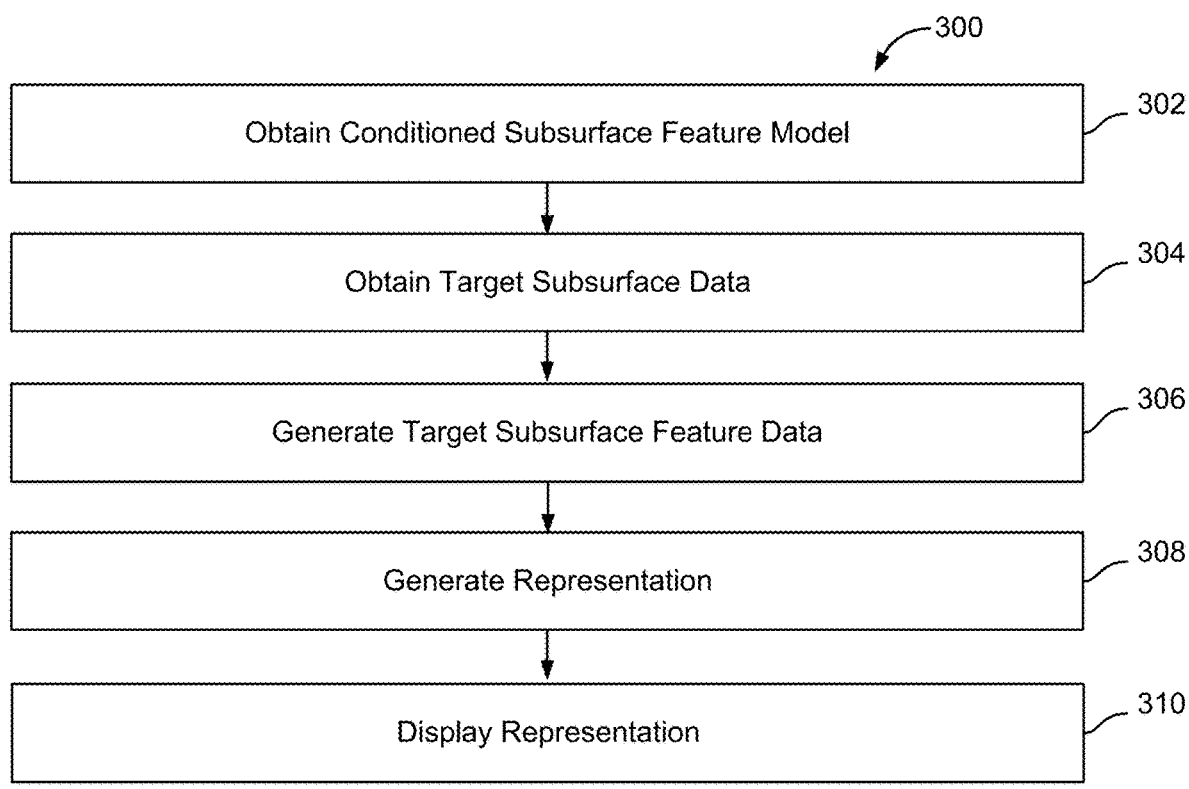
FIG. 3 illustrates an example operational flow diagram for identifying subsurface features as functions of feature positions in a subsurface volume of interest, in accordance with one or more implementations of the present disclosure.

FIG. 2 illustrates an example operational flow diagram 200 for training a subsurface feature model to identify subsurface features as functions of feature positions in a subsurface volume of interest and identifying subsurface features as functions of feature positions in a subsurface volume of interest, in accordance with one or more implementations of the present disclosure. The operations of 200 and 300 presented below are intended to be illustrative. In some implementations, 200 and 300 may be accomplished with additional operations not described, and/or without one of the operations discussed. Additionally, the order in which the operations of methods 200 and 300 are illustrated in FIGS. 2 and 3 and described below is not intended to be limiting.

In some implementations, methods 200 and 300 may be implemented in a processing device (e.g., a physical computer processor, a digital processor, an analog processor, a digital circuit designed to process information, an analog circuit designed to process information, a state machine, and/or other mechanisms for electronically processing information). The processing device may include a device executing some or all of the operations of methods 200 and 300 in response to instructions stored electronically on an electronic storage medium. The processing device may include a device configured through hardware, firmware, and/or software to be specifically designed for execution of operations of methods 200 and 300.

202 may include obtaining training subsurface data and training subsurface feature data. The training subsurface data may specify subsurface energy values. In implementations, the training subsurface data may be seismic images including prototypical candidates of subsurface features. The training subsurface data may be used to train the initial subsurface feature model. The training subsurface data may include field data and/or synthetic data. In some implementations, the training subsurface data may be preprocessed, as described herein.

The training subsurface feature data may also be used to train the initial subsurface feature model, as discussed herein. The training subsurface feature data may include structural identification values and categorization values. The training subsurface feature data may include field data and/or synthetic data. The training subsurface feature data may correspond to the training subsurface data. 202 may be perform performed by a physical computer processor configured by machine-readable instructions including a component that is the same as or similar to subsurface data component 110 and/or subsurface feature data component 112, in accordance with one or more implementations.

204 may include obtaining an initial subsurface feature model. As discussed herein, the initial subsurface feature model may be based on machine learning techniques and may be "untrained." The initial subsurface feature model may receive subsurface data as input and output subsurface feature data, which identifies subsurface features in the subsurface data. The tiered structure of the subsurface feature model may allow users to more easily interpret the subsurface feature data. 204 may be performed by a physical computer processor configured by machine-readable instructions including a component that is the same as or similar to subsurface feature model component 108, in accordance with one or more implementations.

206 may include generating a conditioned subsurface feature model. The conditioned subsurface feature model may be generated by training the initial subsurface feature model using training subsurface data and training subsurface feature data. The conditioned subsurface feature model may be an optimized subsurface feature model in comparison to the initial subsurface feature model, as discussed herein. The conditioned subsurface feature model may receive field data from a subsurface volume of interest for the subsurface data as input and output subsurface feature data. 206 may be performed by a physical computer processor configured by machine-readable instructions including a component that is the same as or similar to subsurface feature model component 108, in accordance with one or more implementations.

208 may include storing the conditioned subsurface feature model. 208 may be performed by a physical computer processor configured by machine-readable instructions including a component that is the same as or similar to subsurface feature model component 108, in accordance with one or more implementations.

210 may include obtaining target subsurface data. The target subsurface data may be field data. The target subsurface data may specify subsurface energy values for the feature positions in the subsurface volume of interest. In implementations, the target subsurface data may be preprocessed via feature engineering, denoising, and/or other preprocessing techniques. 210 may be performed by a physical computer processor configured by machine-readable instructions including a component that is the same as or similar to subsurface data component 110, in accordance with one or more implementations.

212 may include generating target subsurface feature data. The target subsurface feature data may be generated by applying the conditioned subsurface feature model to the target subsurface data. The target subsurface feature data may include structural identification values and categorization values. The tiered structure of the conditioned subsurface feature model and the structural identification values and the categorization values may allow a user to more easily identify the veracity of the subsurface feature data. 212 may be performed by a physical computer processor configured by machine-readable instructions including a component that is the same as or similar to subsurface feature data component 112, in accordance with one or more implementations.

214 may include generating the representation. The representation may be generated using visual effects to depict at least some of the subsurface data, subsurface feature data, and/or uncertainty based on the feature positions. 214 may be performed by a physical computer processor configured by machine-readable instructions including a component that is the same as or similar to representation component 116, in accordance with one or more implementations.

216 may include displaying the representation. 216 may be performed by a physical computer processor configured by machine-readable instructions including a component that is the same as or similar to representation component 116, in accordance with one or more implementations.

In some implementations, method 200 may include generating uncertainty. The uncertainty may specify a likelihood a value is accurate and/or a range of values between which a "true" value exists. The uncertainty may be based on differences between a common source, as discussed herein. The uncertainty may be based on different models and functions. This may be performed by a physical computer processor configured by machine-readable instructions including a component that is the same as or similar to uncertainty component 114, in accordance with one or more implementations.

FIG. 3 illustrates an example operational flow diagram 300 for identifying subsurface features as functions of feature positions in a subsurface volume of interest, in accordance with one or more implementations of the present disclosure. 302 may include obtaining the conditioned subsurface feature model. In some implementations, the conditioned subsurface feature model may have already been generated and stored, as discussed in FIG. 2. 302 may be performed by a physical computer processor configured by machine-readable instructions including a component that is the same as or similar to subsurface feature model component 108, in accordance with one or more implementations.

304 may include obtaining target subsurface data. This may be substantially similar to, or the same as, 210. 304 may be performed by a physical computer processor configured by machine-readable instructions including a component that is the same as or similar to subsurface data component 110, in accordance with one or more implementations.

306 may include generating target subsurface feature data. This may be substantially similar to, or the same as, 212. 306 may be performed by a physical computer processor configured by machine-readable instructions including a component that is the same as or similar to subsurface feature data component 112, in accordance with one or more implementations.

308 may include generating the representation. This may be substantially similar to, or the same as, 214. 308 may be performed by a physical computer processor configured by machine-readable instructions including a component that is the same as or similar to representation component 116, in accordance with one or more implementations.

310 may include displaying the representation. This may be substantially similar to, or the same as, 216. 310 may be performed by a physical computer processor configured by machine-readable instructions including a component that is the same as or similar to representation component 116, in accordance with one or more implementations.

In some implementations, method 300 may include generating uncertainty, which may be substantially similar to, or the same as, the uncertainty discussed in method 200. This may be performed by a physical computer processor configured by machine-readable instructions including a component that is the same as or similar to uncertainty component 114, in accordance with one or more implementations.

Figure 4:
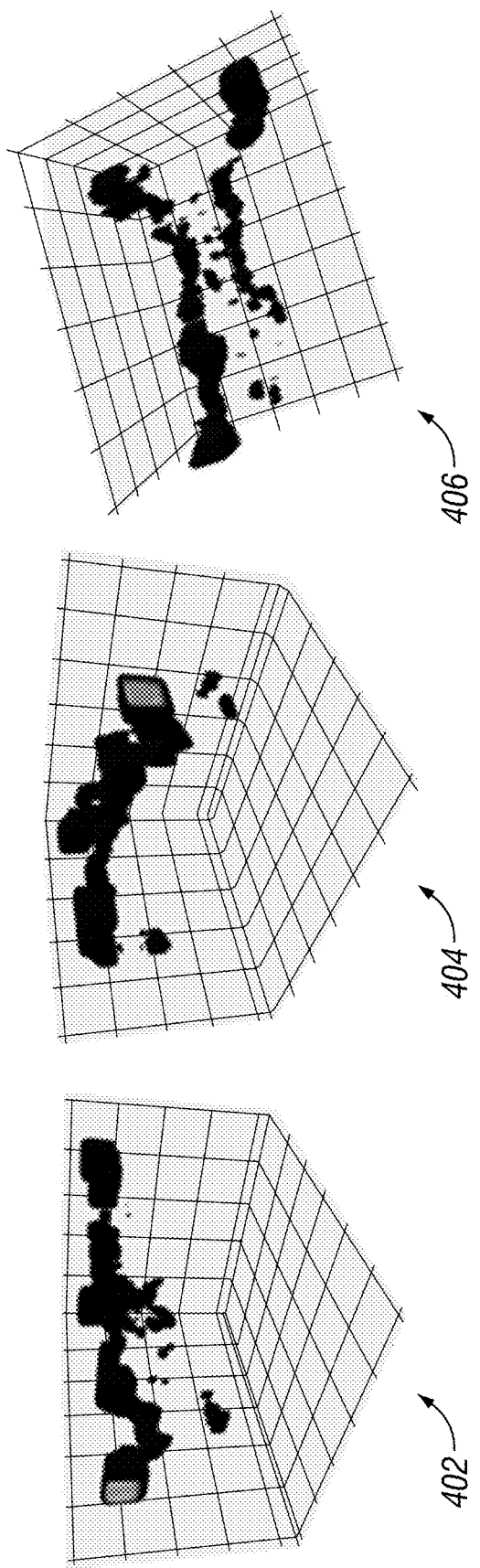
FIG. 4 illustrates an example representation of geological structures in a subsurface volume of interest, in accordance with one or more implementations of the present disclosure.

FIG. 4 illustrates an example representation of geological structures in a subsurface volume of interest, in accordance with one or more implementations of the present disclosure. 402 may show a 3D representation of a geological structure in a subsurface volume of interest from a first perspective. 404 may show a 3D representation of a geological structure in a subsurface volume of interest from a second perspective. 406 may show a 3D representation of a geological structure in a subsurface volume of interest from a third perspective.

The presently disclosed technology may provide robust systems and methods to identify multiple different structural features with explainable logic based on machine learning that leverages the tiered technology discussed herein. For example, the presently disclosed technology can be used to identify structural features in a heterogeneous seismic image and indicate probabilities of a structural feature's existence, and if there is a structural feature, what category and/or class of structural feature it is along with its corresponding probability. The tiered structure discussed herein provides interpretability to machine learning that does not currently exist. The presently disclosed technology may provide significant advantages to reservoir management decisions, such as for example, well development, production forecasting, reservoir performance, as well as improving reservoir uncertainty management planning.

Figure 5:
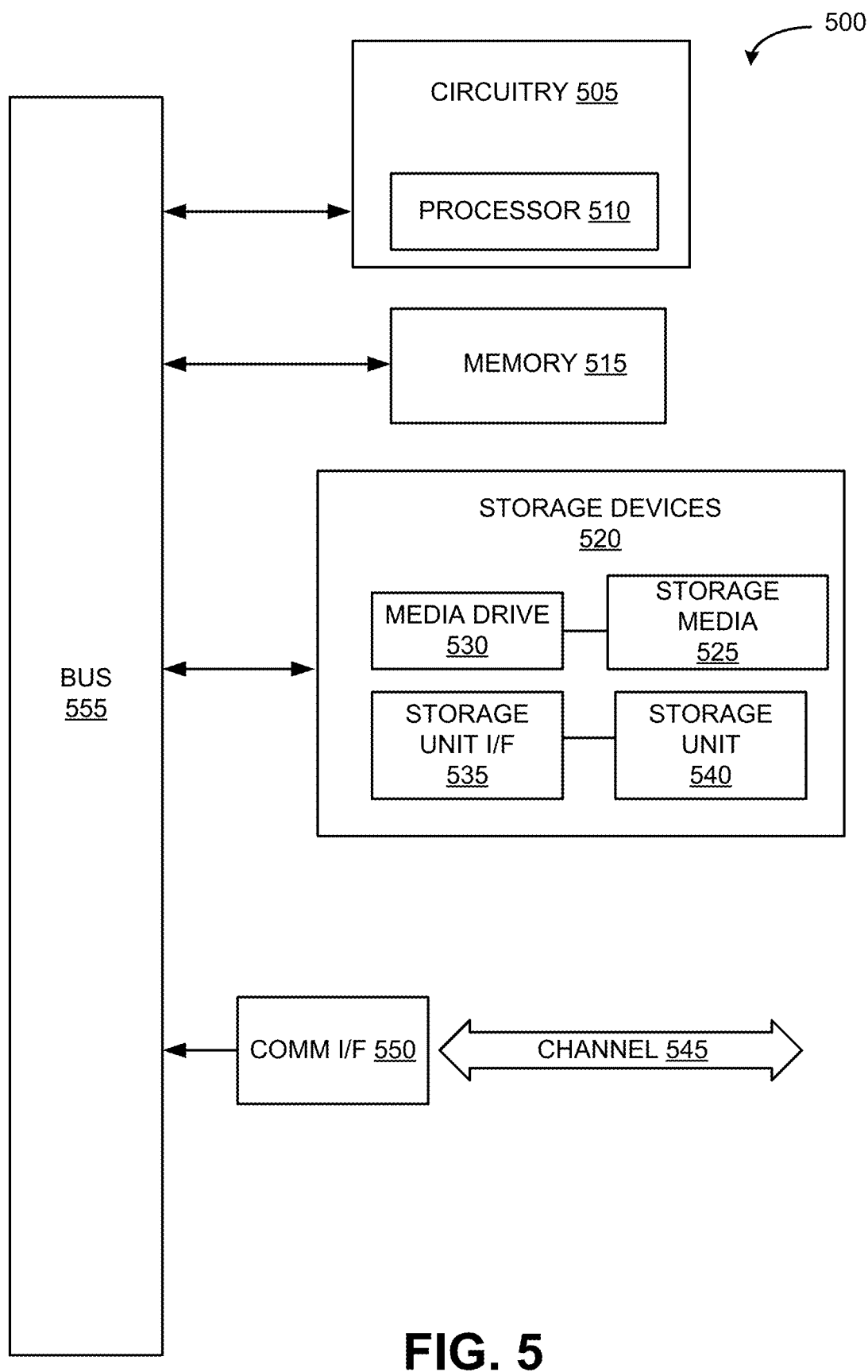
FIG. 5 illustrates an example computing component that may be used in implementing various features of the disclosed technology.

As used herein, the term component might describe a given unit of functionality that can be performed in accordance with one or more implementations, of the technology disclosed herein. As used herein, a component might be implemented utilizing any form of hardware, software, or a combination thereof. For example, a processor, controller, ASIC, PLA, PAL, CPLD, FPGA, logical component, software routine or other mechanism might be implemented to make up a component. In implementation, the various components described herein might be implemented as discrete components or the functions and features described can be shared in part or in total among components. In other words, as would be apparent to one of ordinary skill in the art after reading this description, the various features and functionality described herein may be implemented in any given application and can be implemented in separate or shared components in various combinations and permutations. Even though various features or elements of functionality may be individually described or claimed as separate components, one of ordinary skill in the art will understand that these features and functionality can be shared among common software and hardware elements, and such description shall not require or imply that separate hardware or software components are used to implement such features or functionality.

Where components of the technology are implemented in whole or in part using software, in one or more implementations, these software elements can be implemented to operate with a computing or processing component capable of carrying out the functionality described with respect thereto. One such example computing component is shown in FIG. 5. Various implementations are described in terms of this example-computing component 500. After reading this description, it will become apparent to a person skilled in the relevant art how to implement the technology using other computing components or architectures.

Referring now to FIG. 5, computing component 500 may represent, for example, computing or processing capabilities found within mainframes, supercomputers, workstations, or servers; desktop, laptop, notebook, or tablet computers; hand-held computing devices (tablets, PDA's, smartphones, cell phones, palmtops, and/or other hand-held computing devices); or the like, depending on the application and/or environment for which computing component 500 is specifically purposed.

Computing component 500 may include, for example, a processor, controller, control component, or other processing device, such as a processor 510, and such as may be included in circuitry 505. Processor 510 may be implemented using a special-purpose processing component such as, for example, a microprocessor, controller, or other control logic. In the illustrated example, processor 510 is connected to bus 555 by way of circuitry 505, although any communication medium may be used to facilitate interaction with other components of computing component 500 or to communicate externally.

Computing component 500 may also include a memory component, simply referred to herein as main memory 515. For example, random access memory (RAM) or other dynamic memory may be used for storing information and instructions to be executed by processor 510 or circuitry 505. Main memory 515 may also be used for storing temporary variables or other intermediate information during execution of instructions to be executed by processor 510 or circuitry 505. Computing component 500 may likewise include a read only memory (ROM) or other static storage device coupled to bus 555 for storing static information and instructions for processor 510 or circuitry 505.

Computing component 500 may also include various forms of information storage devices 520, which may include, for example, media drive 530 and storage unit interface 535. Media drive 530 may include a drive or other mechanism to support fixed or removable storage media 525. For example, a hard disk drive, a floppy disk drive, a magnetic tape drive, an optical disk drive, a CD or DVD drive (R or RW), or other removable or fixed media drive may be provided. Accordingly, removable storage media 525 may include, for example, a hard disk, a floppy disk, magnetic tape, cartridge, optical disk, a CD or DVD, or other fixed or removable medium that is read by, written to, or accessed by media drive 530. As these examples illustrate, removable storage media 525 may include a computer usable storage medium having stored therein computer software or data.

In alternative implementations, information storage devices 520 may include other similar instrumentalities for allowing computer programs or other instructions or data to be loaded into computing component 500. Such instrumentalities may include, for example, fixed or removable storage unit 540 and storage unit interface 535. Examples of such removable storage units 540 and storage unit interfaces 535 may include a program cartridge and cartridge interface, a removable memory (for example, a flash memory or other removable memory component) and memory slot, a PCM-CIA slot and card, and other fixed or removable storage units 540 and storage unit interfaces 535 that allow software and data to be transferred from removable storage unit 540 to computing component 500.

Computing component 500 may also include a communications interface 550. Communications interface 550 may be used to allow software and data to be transferred between computing component 500 and external devices. Examples of communications interface 550 include a modem or soft-modem, a network interface (such as an Ethernet, network interface card, WiMedia, IEEE 502.XX, or other interface), a communications port (such as for example, a USB port, IR port, RS232 port Bluetooth® interface, or other port), or other communications interface. Software and data transferred via communications interface 550 may typically be carried on signals, which may be electronic, electromagnetic (which includes optical) or other signals capable of being exchanged by a given communications interface 550. These signals may be provided to/from communications interface 550 via channel 545. Channel 545 may carry signals and may be implemented using a wired or wireless communication medium. Some non-limiting examples of channel 545 include a phone line, a cellular or other radio link, a RF link, an optical link, a network interface, a local or wide area network, and other wired or wireless communications channels.

In this document, the terms "computer program medium" and "computer usable medium" are used to generally refer to transitory or non-transitory media such as, for example, main memory 515, storage unit interface 535, removable storage media 525, and channel 545. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 500 or a processor to perform features or functions of the present application as discussed herein.

While various implementations, of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations, be implemented to perform the recited functionality in the same order unless the context dictates otherwise.

Although the disclosed technology is described above in terms of various exemplary implementations, and implementations, it should be understood that the various features, aspects, and functionality described in one of the individual implementations, are not limited in their applicability to the particular implementation with which they are described, but instead can be applied, alone or in various combinations, to one of the other implementations, of the disclosed technology, whether or not such implementations, are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The presence of words such as "first," "second," "third," or other like words in some instances shall not be read to mean there can only be one, two or three elements; it should be appreciated that there may be more than one, two, or three elements used in the presently disclosed technology. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations, set forth herein are described in terms of exemplary block diagrams, flow charts, and other illustrations. As will become apparent to one of ordinary skill in the art after reading this document, the illustrated implementations, and their various alternatives can be implemented without confinement to the illustrated examples. For example, block diagrams and their accompanying description should not be construed as mandating a particular architecture or configuration.

What is claimed is:

1. A computer-implemented method for training a subsurface feature model to identify subsurface features as functions of feature positions in a subsurface volume of interest, the method being implemented in a computer system that comprises a physical computer processor and non-transient electronic storage, the method comprising:
   obtaining, from the non-transient electronic storage, training subsurface data and corresponding training subsurface feature data associated with the subsurface volume of interest;
   obtaining, from the non-transient electronic storage, an initial subsurface feature model of the subsurface volume of interest;
   generating, with the physical computer processor, a conditioned subsurface feature model associated with the subsurface volume of interest by training the initial subsurface feature model using the training subsurface data and the corresponding training subsurface feature data;
   wherein the training subsurface data comprises subsurface energy values of the feature positions and the training subsurface feature data comprises training structural identification values associated with the subsurface volume of interest defined by structural identification parameters for the feature positions and corresponding training categorization values defined by categorization parameters for the feature positions and the training structural identification values,
   wherein the structural identification parameters comprise one of a geometric shape of subsurface horizons and a truncation of the subsurface horizons against other geologic elements;
   wherein the initial subsurface feature model comprises tiers of elements, wherein the tiers comprise a first tier comprising structural identification elements of the subsurface volume of interest corresponding to the training structural identification values and a second tier, dependent on the training structural identification values, comprising categorization elements associated with the subsurface volume of interest corresponding to the training categorization values; and
   storing the conditioned subsurface feature model in the non-transient electronic storage.

2. The computer-implemented method of claim 1, further comprising:
   obtaining, from the non-transient electronic storage, target subsurface data comprising subsurface energy values associated with the feature positions in the subsurface volume of interest; and
   generating, with the physical computer processor, target subsurface feature data of the subsurface volume of interest by applying the conditioned subsurface feature model to the target subsurface data, wherein the target subsurface feature data comprises a target structural identification value defined by the structural identification parameters associated with the feature positions in the subsurface volume of interest and a corresponding target categorization value defined by the categorization parameters and target structural identification values for each of the feature positions in the subsurface volume of interest.

3. The computer-implemented method of claim 2, wherein the computer system comprises a display, and wherein the computer-implemented method further comprises:
   generating, with the physical computer processor, a representation of geological structures and positions of the structures in the subsurface volume of interest using visual effects to depict at least some of the target subsurface feature data; and
   displaying the representation via the display.

4. The computer-implemented method of claim 2, wherein the training structural identification values and the target structural identification value indicate whether or not there is a subsurface feature associated with the subsurface volume of interest.

5. The computer-implemented method of claim 2, wherein the training categorization values and the target categorization value indicate one of what category a subsurface feature associated with the subsurface volume of interest is categorized as and what sub-category the subsurface feature is categorized as.

6. The computer-implemented method of claim 2, further comprising generating, with the physical computer processor, uncertainty corresponding to the target subsurface feature data of the subsurface volume of interest, wherein the conditioned subsurface feature model further comprises a subsurface feature uncertainty model of the subsurface volume of interest, and wherein applying the uncertainty model to target subsurface data generates target subsurface feature data probabilities for positions of the subsurface volume of interest indicating a structural identification value probability for the subsurface features of the subsurface volume of interest and a corresponding target categorization value probability for the subsurface features of the subsurface volume of interest.

7. The computer-implemented method of claim 1, wherein the categorization parameters comprise one of a histogram of oriented gradients (HOG), a scale-invariant feature transform (SIFT), an analog geologic feature.

8. The computer-implemented method of claim 1, wherein different ones of the structural identification parameters and the categorization parameters are weighted differently based on the conditioned subsurface feature model.

9. The computer-implemented method of claim 1, wherein a structure of the tiers corresponds to a hierarchy of geological taxonomy.

10. The computer-implemented method of claim 1, wherein the categorization elements comprise one of an extensional element, a faulted element, a contractional fold element, a salt element, a fault bend fold element, a tip-line fold element, a detachment fold element, and a gas chimney element.

11. The computer-implemented method of claim 1, wherein the initial subsurface feature model and the conditioned subsurface feature model comprise one of a mask R-CNN network, a feature pyramids network, an object detection network, a neural network, a random forest model, a support vector machine, a regression, and a Bayesian network.

12. A computer-implemented method for identifying subsurface features as functions of feature positions in a subsurface volume of interest, the method being implemented in a computer system that comprises a physical computer processor and electronic storage, the method comprising:
  obtaining, from the electronic storage, a conditioned subsurface feature model of the subsurface volume of interest;
  obtaining, from the non-transient electronic storage, target subsurface data of the subsurface volume of interest comprising subsurface energy values of the features positions in the subsurface volume of interest; and
  generating, with the physical computer processor, target subsurface feature data of the subsurface volume of interest by applying the conditioned subsurface feature model to the target subsurface data, wherein the target subsurface feature data comprises a target structural identification value defined by the structural identification parameters for the feature positions in the subsurface volume of interest and a corresponding target categorization value associated with the subsurface volume of interest defined by the categorization parameters and the target structural identification value associated with the feature positions in the subsurface volume of interest;
  wherein the conditioned subsurface feature model of the subsurface volume of interest comprises tiers of elements, the conditioned subsurface feature model having been generated by applying an initial subsurface feature model of the subsurface volume of interest to training subsurface data of the subsurface volume of interest and training subsurface feature data of the subsurface features;
  wherein the tiers comprise a first tier comprising structural identification elements of the subsurface volume of interest corresponding to training structural identification values associated with the subsurface volume of interest and a second tier, dependent on the structural identification values, comprising categorization elements associated with the subsurface volume of interest corresponding to training categorization values associated with the subsurface volume of interest,
  wherein the training subsurface data comprises subsurface energy values of the feature positions, wherein the training subsurface feature data comprises the training structural identification values defined by structural identification parameters for the feature positions and corresponding training categorization values defined by categorization parameters for the feature positions and one of the training structural identification values,
  wherein the structural identification parameters comprise one of a geometric shape of subsurface horizons and a truncation of the subsurface horizons against other geologic elements.

13. The computer-implemented method of claim 12, wherein the computer system comprises a display, and wherein the computer-implemented method further comprises:
  generating, with the physical computer processor, a representation of geological structures and positions of the geological structures in the subsurface volume of interest using visual effects to depict at least some of the target subsurface feature data; and
  displaying the representation via the display.

14. The computer-implemented method of claim 12, wherein the categorization elements comprise one of an extensional element, a faulted element, a contractional fold element, a salt element, a fault bend fold element, a tip-line fold element, a detachment fold element, and a gas chimney element.

15. The computer-implemented method of claim 12, wherein the initial subsurface feature model and the conditioned subsurface feature model comprise one of a mask R-CNN network, a feature pyramids network, an object detection network, a neural network, a random forest model, a support vector machine, a regression, and a Bayesian network.

16. The computer-implemented method of claim 12, further comprising generating, with the physical computer processor, uncertainty corresponding to the target subsurface feature data of the subsurface volume of interest based on $$H(P) = -\sum_{c=1}^{c=M} P(SubFeat = C) \log P(SubFeat = C)$$

where c represents a given category of the subsurface feature in the subsurface volume of interest, M represents different categories of subsurface features, and P(SubFeat=C) represents a probability of the recognized subsurface feature of a given category associated with the subsurface volume of interest.

17. A system for identifying subsurface features as functions of feature positions in a subsurface volume of interest, the system comprising:
- electronic storage; and
- a physical computer processor configured by machine readable instructions to:
- obtain, from the electronic storage, a conditioned subsurface feature model of the subsurface volume of interest;
- obtain, from the non-transient electronic storage, target subsurface data of the subsurface volume of interest comprising subsurface energy values of the features positions in the subsurface volume of interest; and
- generating, with the physical computer processor, target subsurface feature data of the subsurface volume of interest by applying the conditioned subsurface feature model to the target subsurface data, wherein the target subsurface feature data comprises a target structural identification value defined by the structural identification parameters for the feature positions in the subsurface volume of interest and a corresponding target categorization value associated with the subsurface volume of interest defined by the categorization parameters and the target structural identification value associated with the feature positions in the subsurface volume of interest;
- wherein the conditioned subsurface feature model of the subsurface volume of interest comprises tiers of elements, the conditioned subsurface feature model having been generated by applying an initial subsurface feature model of the subsurface volume of interest to training subsurface data of the subsurface volume of interest and training subsurface feature data of the subsurface features;
- wherein the tiers comprise a first tier comprising structural identification elements of the subsurface volume of interest corresponding to training structural identification values associated with the subsurface volume of interest and a second tier, dependent on the structural identification values, comprising categorization elements associated with the subsurface volume of interest corresponding to training categorization values associated with the subsurface volume of interest,
- wherein the training subsurface data comprises subsurface energy values of the feature positions, wherein the training subsurface feature data comprises the training structural identification values defined by structural identification parameters for the feature positions and corresponding training categorization values defined by categorization parameters for the feature positions and one of the training structural identification values,
- wherein the structural identification parameters comprise one of a geometric shape of subsurface horizons and a truncation of the subsurface horizons against other geologic elements.

18. The system of claim 17, wherein the system further comprises a display, and wherein the physical computer processor is further configured by machine readable instructions to:
- generate, with the physical computer processor, a representation of geological structures and positions of the structures in the subsurface volume of interest using visual effects to depict at least some of the target subsurface feature data; and
- display the representation via the display.

19. The system of claim 17, wherein the initial subsurface feature model and the conditioned subsurface feature model comprise one of a mask R-CNN network, a feature pyramids network, an object detection network, a neural network, a random forest model, a support vector machine, a regression, and a Bayesian network.

* * * * *